United States Patent [19]
Allington et al.

[11] 3,746,982
[45] July 17, 1973

[54] APPARATUS FOR INDICATING THAT A CHROMATOGRAPHIC SIGNAL HAS ENDED

[75] Inventors: Robert W. Allington; Herbert C. Griess, both of Lincoln, Nebr.

[73] Assignee: Instrumentation Specialties Company, Lincoln, Nebr.

[22] Filed: Nov. 17, 1970

[21] Appl. No.: 90,247

[52] U.S. Cl............ 324/77 A, 235/151.35, 328/114, 328/115, 328/121, 328/146, 328/148
[51] Int. Cl......................... G01r 23/16, G01r 27/02
[58] Field of Search...................... 324/77, 103, 102, 324/130; 328/114, 115, 121, 130, 146, 147, 148; 235/151.35; 307/263, 234, 235

[56] References Cited
UNITED STATES PATENTS

| 3,412,241 | 11/1968 | Spence et al.................... 324/103 P |
| 3,095,541 | 6/1963 | Ashcraft........................... 328/115 |
| 3,315,168 | 4/1967 | Cantella.......................... 307/234 X |
| 3,437,833 | 4/1969 | Razaitis et al. ................. 307/234 X |

Primary Examiner—Stanley T. Krawczewicz
Attorney—Vincent L. Carney

[57] ABSTRACT

For compensation of a chromatographic signal, a circuit first indicates the existence of a baseline. This is done by issuing a pulse when a counter indicates that the time during which the signal exhibits no slope has equalled the total time of positive and negative slopes since the start of a chromatographic peak. When a circuit detects that the peak's apex is sharp, the counter is reset so that the counted no-slope time must equal only the slope time after the apex. Short noise peaks are inhibited by supressing readout when a positive slope or a negative slope lasts less than a given time period.

17 Claims, 3 Drawing Figures

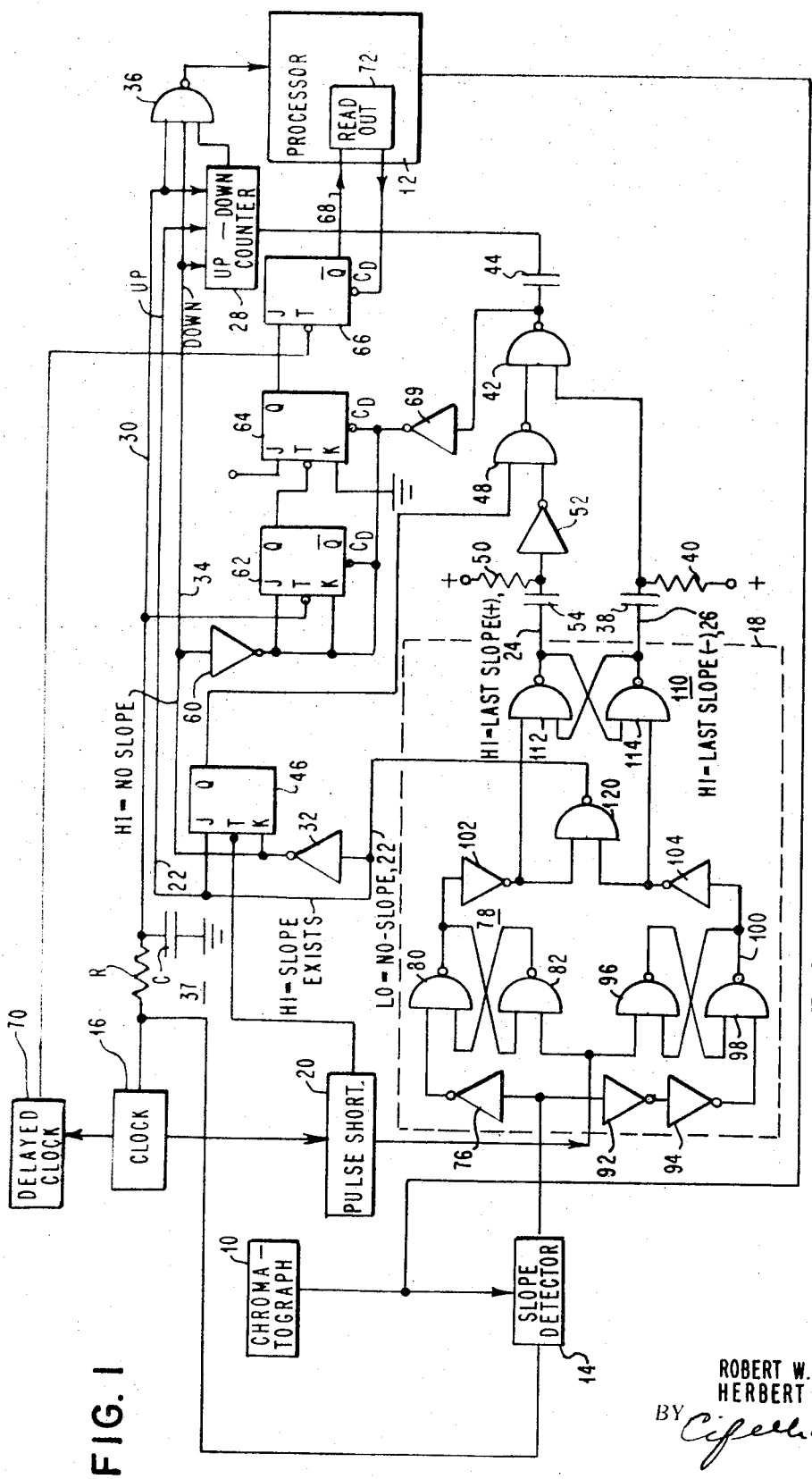

3,746,982

APPARATUS FOR INDICATING THAT A CHROMATOGRAPHIC SIGNAL HAS ENDED

REFERENCES TO COPENDING APPLICATIONS

The following copending applications are referred to in this application. The contents of these applications are hereby made a part of this application as if fully recited herein.

Application of Robert W. Allington, U.S. Ser. No. 90,252, filed Nov. 17, 1970 now U.S. Pat. No. 3,711,779, assigned to the same assignee as this application, and entitled "Apparatus for Determining and Characterizing the Slope of Time-Varying Signals."

Application of Robert W. Allington and Herbert C. Griess, U.S. Ser. No. 90,249, filed Nov. 17, 1970 now U.S. Pat. No. 3,667,056, assigned to the same assignee as this application, and entitled Sample, Hold and Subtract Circuit.

BACKGROUND OF THE INVENTION

This invention relates to electrical apparatuses, for distinguishing between significant characteristics of a time-varying signal waveform and more particularly relates to apparatuses and methods for determining when a time-varying signal has ended and a baseline potential is present without the signal.

The invention has particular reference to analyzers which process the outputs of a gas or liquid chromatograph. The output signal of a chromatograph generally follows a baseline interrupted by significant peaks which offer information concerning the various components of a fluid mixture being tested. Sometimes the desired information resides in the heights of the peaks. In other cases the areas bounded by the peaks and a baseline contain desired information. To measure these significant conditions accurately it is necessary to compensate for various accuracy-degrading influences on the signal such as drift and noise peaks. Drift can be decreased by resetting the signal each time. This requires the analyzer to distinguish between the baseline and the significant peaks, a task usually accomplished by measuring the slope of the signal.

The peaks themselves can exhibit shapes that compound the difficulty in correcting for drift and other errors. They can blur the distinction between the peaks and the baseline. For example the descending side of a peak may exhibit a slope considerably less than the ascending side. This is called tailing. With tailing the descending side may almost equal the baseline slope. Therefore, in the equipment for correcting for drift, the slope detecting apparatus may not be sufficiently sensitive to distinguish between the slopes of the descending side and the baseline. Compensation may then be carried out too soon. It may be carried out while the peak still exists and result in errors.

It is possible to overcome the deficiency of tailing by increasing the sensitivity of the slope detecting apparatus. However making it sensitive enough for accurately sensing the slope of the trailing edge may make it too sensitive for the leading edge. This can cause difficulties such as spurious detection of peak slopes due to electrical noise levels.

It is also possible to overcome this last objection by increasing the sensitivity selectively, namely by making it greater during the descending side of the peak. However, on the descending side of the peak the problems of excessive sensitivity reappear.

SUMMARY OF THE INVENTION

According to a feature of the invention, these disadvantages are overcome by measuring the total time, from the onset of a slope, during which the signal has a slope, and during which the signal has no slope, and then producing an output only when the no-slope period has a certain variable relation to the slope period. Preferably the output is produced when the no-slope period becomes as great as the slope period. The period during which slope is measured includes both the time of positive slopes and a negative slopes. By virtue of this feature the output which may allow or initiate adjustment of the signal level, occurs after the peak has ended and a baseline has started. Preferably circuit means define the existence of a slope as that when a positive slope exceeds a minimum predetermined positive threshold slope, and when a negative slope exceeds in negative value a predetermined given negative threshold slope. The no-slope condition is defined as having a slope less than either predetermined minimum or threshold.

According to another feature of the invention, measuring means measure the total time of the slope conditions. These measuring means have reset means that restart the measurements when the time total of no-slope measurement equals the time total of slope measurements. Preferably the measuring means include an up-down counter. Preferably circuit means that detect the slope conditions produce the indications in the form of clock pulses that are counted by the counter.

According to still another feature of the invention, electrical means reset the measuring means to start measuring again if after the positive slope at the ascending portion of the peak, the peak starts to descend before the elapse of a given time period during which there is no slope. This rapid start of descent after the ascent indicates a sharp peak. The start of slope measurement only after the apex of the peak allows the no-slope period to equal the slope period sooner. It thus allows issuance of an earlier output to indicate a baseline. This avoids interference with a subsequent peak.

This invention is based upon the recognition that any peak that exhibits the property of a slowly decaying descent will eventually fall to the original baseline level at sometime after its slope has flattened, to some slope comparable with the slope at the very beginning of the peak. This time is longer for peaks of longer duration and also may tend to be longer with peaks having relatively flat tops.

According to yet another feature of the invention the apparatus distinguishes between significant chromatographic peaks and noise peaks by measuring the time during which a peak has one type of slope, positive or negative. If the peak reverses before a predetermined time period, readout of the signal is inhibited. This suppresses noise signals. This feature is based upon recognition that noise peaks tend to have shorter time periods than chromatographic peaks.

These and other features of the invention are pointed out in the claims. Many objects and advantages of the invention will become obvious from the following detailed description when read in light of the following drawing.

BRIEF DESCRIPTION OF DRAWING:

FIG. 1 is a schematic block diagram of a chromatographic analyzing system embodying features of the invention;

FIG. 2 is a time-voltage graph illustrating a signal appearing in the analyzer of FIG. 1; and FIG. 3 is a time-voltage graph illustrating another signal appearing in the analyzer of FIG. 1.

DETAILED DESCRIPTION OF PREFERRED EMBODIMENT:

In FIG. 1 a chromatograph 10 tests a gas or liquid mixture. The chromatograph generates a time varying voltage composed of a baseline interrupted by a series of peaks representing the components of the fluid mixture being tested. The signal is applied to a processor 12, which together with the remaining control apparatus in FIG. 1 constitutes a chromatographic analyzer. To control the processor 12 the signal from chromatograph 10 is also applied to a digital slope detector 14. The latter issues a positive pulse each time it receives a clock pulse from a clock 16 while the slope of the signal applied thereto exceeds a predetermined minimum positive value. Whenever the signal exceeds i.e. is more negative than a predetermined minimum negative value during a clock pulse the slope detector issues a negative pulse. These positive and negative minimum or threshold values are close to zero so that slopes falling between these two minimum values have substantially no slope. For convenience the slopes falling between the positive minimum value and the negative minimum value are referred herein as having no slope. Also for convenience slopes exceeding the positive minimum value are called positive slopes and those that are more negative than the negative minimum value are called negative slopes. Furthermore "having a slope" is used herein to mean that the slope of the signal, that is its voltage variations with respect to time, is either positive or negative. That is to say it exceeds either the positive minimum value or is greater, i.e. more negative, than the negative minimum value. The minimum values may also be considered as threshold values which the slopes must exceed to be slopes.

The slope detector 14 may be the same as that described in the before mentioned copending application of Robert W. Allington, U.S. Ser. No. 90,252, filed concurrently herewith. As mentioned therein, the clock 16 which pulses the slope detector emits a series of pulses whose repetition rate may be varied between ten and forty pulses per peak of the chromatograph signal. Also described in the copending application is a logic circuit 18 which establishes various logic potentials representing features of the voltages at the output of the slope detector 14. Moreover this copending application describes a pulse shortener 20 that delays the start of the clock pulse and accelerates its end to produce shortened pulse.

The logic circuit 18 produces outputs at three lines 22, 24, and 26. When the slope detector 14 indicates that the chromatographic signal has a slope, that is, the positive slope is greater than the positive minimum or the slope is more negative than the negative minimum, the logic circuit produces a logical ONE at a line 22. By logical ONE is meant that the line achieves one of two binary voltage levels, the other of which is called ZERO. In this context logical ONE indicates that the voltage level achieved is "high" or "positive," that is it is the higher of the two binary levels available at the output. The ZERO output here is the lower of the two achievable binary levels and is called a "low" or "negative" although the voltage may not actually be negative. A low on line 22 indicates that the signal has no slope, i.e. a slope that lies betweeen the two minima.

A high on the line 24 indicates that when the signal last had a slope, the slope was positive. A high on line 26 indicates that when the chromatograph signal last had a slope it was negative. A low on line 24 indicates a negative slope and a low on line 26 indicates a positive slope. A change from a more positive to a more negative potential on the lines 24 or 26 indicates respectively transitions to negative slope and transition to positive slope.

When the slope detector 14 indicates, by issuing positive pulses to denote a positive slope, that a peak has started a high appears on line 22. The line 22 applies the high to one input of an up-down counter 28. When the next pulse from clock 16 arrives at the counter 28 on a line 30 the counter counts up once. With each succeeding pulse the counter counts up once more as long as the high remains on line 22. That high on line 22 remains as long as the signal has a positive or negative slope.

If the peak reaches a plateau and the signal exhibits no slope the high on line 22 becomes low. An amplifying inverter 32 reverses the low on line 22 and places a high on a line 34. During this high, pulses from the clock 16 on line 30 cause the counter to count down. This plateau usually lasts a shorter time than the original signal rise and is followed by a negative slope or signal decline. This negative slope is also a slope which produces a high on line 22 and a low on line 34. Subsequent clock pulses on line 30 cause the counter 28 to count up again. A high signal is always present on lead 22 or lead 34, but not simultaneously.

At the end of the peak and hence the end of the declining signal the slope becomes zero again and the high reappears on line 34. The counter 28 now counts down during this no-slope, baseline, signal. When the counter 28 counts down to zero the counter emits high output potential. This occurs after the end of the peak. The output high appears at one of three inputs to a gate 36. In this case the gate and similarly drawn gates are NAND gates. Such gates produce a low, which represents a binary ZERO at the output when all the input terminals thereto are high, which represents a binary ONE. The NAND output becomes high in response to at least one low input. The gates may be of any suitable ordinary logic family such as DTL or TTL. The up-down counter 28 serves as a storage means for storing a value, hereinafter called a value of slope-time signal, which value is related to the time that has elapsed since a slope was last detected by the slope detector 14 subtracted from the length of time that the last detected slope lasted.

Since the signal during this time period is along the baseline and the slope is zero a high still appears on line 34, the second input to gate 36. The next pulse from clock 16 then actuates the gate 36 to emit a low pulse to the processor 12. The gate 36 emits a low pulse only when a clock pulse, zero slope, and a zero count coincide. This low pulse then signals the processor 12 that a baseline exists and the processor may adjust the signal level so that the bottoms of the peaks coincide in voltage to a predetermined level such as zero.

If the baseline changes rapidly enough to be sensed by the slope detector 14, the output of gate 36 can be used to reset the baseline compensator in the processor 12 after the baseline settles down. The up-down counter stops counting down after it reaches a zero value. It stops counting up after reaching an arbitrary number even if it continues to receive up commands. The maximum number to which the counter counts is variable to provide optimum operation with peaks of different shapes.

The output from gate 36 to the processor 12 is used to make a reading or a printing of a stored integral. It also provides a signal to command the resetting of the baseline with apparatus such as is described in the beforementioned application of Robert W. Allington and Herbert C. Griess. A short time delay circuit 37 composed of a resistor R and capacitor C delays the clock pulse on lead 30 to lag behind the time of the application of slope controlled signals on leads 22 and 34. This prevents an output from appearing from gate 36 until the indicator has had time to fully develop on lead 34.

When a new peak starts the transition to the positive slope, circuit 18 generates a negative step at line 26. A differentiator composed of a capacitor 38 and resistor 40 produces a negative pulse from this negative step and applies it to a NAND gate 42. In this gate the negative input produces a positive output pulse that is applied through a capacitor 44 to the up-down counter 28 to reset the counter to zero. This positive output pulse does not start the counter but determines at what point the counter will again begin counting.

Well shaped chromatographic peaks without shoulders on their trailing edges usually have fairly sharp and well defined summits. In such cases where the trailing edge is well shaped, it is possible to distinguish between the peak and the baseline much sooner. This makes it possible to reset the baseline earlier than described above, before the onset of another closely spaced peak, thus improving the accuracy of the processor. To do this, the up-down counter is reset at the top of the peak when the slope becomes negative after a positive slope, provided there has not been too long a period of zero slope between the positive slope and the negative slope. That is, the reset occurs at the top of the peak if the peak does not have a summit which is too broad. The reset helps prevent a high up-count and thus requires only a smaller down-count. The output signal to the processor 12 then occurs much sooner and creates more accurate processing results.

The above reset is accomplished by applying the voltages on lines 22 and 34 to the terminals J and K of a J-K flip-flop 46, which is one component of several that generate signals which indicate the nature of waveforms within the chromatographic signals so that adjustments can be made depending on the waveforms to increase the accuracy with which the circuit of this invention operates as will be explained more fully hereinafter. The onset of a signal slope makes line 22 high and line 34 low. This sets the flip-flop 46 so that at the next shortened pulse at the terminal T from the pulse shortener 20 the flip-flop flips over. A high then appears at the output terminal Q. The high on terminal Q prepares a NAND gate 48. However it does not change the output of gate 48. The output of the latter is kept normally positive by a negative input. The latter arises from the positive voltage which normally appears on a resistor 50 and is inverted to negative by an amplifying inverter 52. Thus the negative lower terminal of gate 48 keeps its output normally positive. This positive voltage at the upper input terminal of gate 42 together with the positive voltage at resistor 40 keeps the output of gate 42 negative. This continues as long as the slope of the input signal remains positive.

If the chromatographic slope now becomes zero, the potentials on terminals J and K reverse the flip-flop 46 reverses with one of the succeeding clock pulses. This makes the terminal Q of flip-flop 46 low and removes the preparatory high on gate 48. No change then occurs at the output of gates 48 and 42. A subsequent change to negative slope has no effect on output of gate 42. This is so because the negative step at line 24 resulting from a transition to negative signal slope, fails to affect the output of gate 48. The latter is prevented from changing by the now existing low at terminal Q of flip-flop 46. The ineffective step is applied to the gate 48 first by a differentiator composed of the resistor 50 and a capacitor 54 and then by the inverter 52, that changes the negative pulse issuing from the differentiator to a positive pulse. Thus a signal peak having a flat top fails to change the operation of the counter 28.

If the signal peak is sharp and changes slope directly from positive to negative with no intervening no-slope pulses from detector 14 the situation is otherwise. Since a slope constantly remains, the high and low on lines 22 and 34 do not reverse the flip flop 46 after setting the high on terminal Q. That high remains. This leaves the gate prepared. When the line 24 exhibits a negative step upon transition to a negative slope, and the negative pulse formed by differentiator elements 50 and 54 is inverted to positive, the gate 48 issues a low that produces a high on the output of gate 42. That resets the up-down counter 28. All this occurs at the apex of the peak. Up counting therefore starts again at the apex of the peak. Up counting therefore continues for a shorter time than with a flat pulse because it ends sooner with the end of the peak. Down counting thus decreases the count to zero sooner, and the processor 12 is permitted to perform signal adjustment sooner and create more accuracy.

The above reset pulse that restarts up-counting occurs even if a no-slope condition occurs between the positive slope and the negative slope, as long as the no-slope lasts only a very short time. If the no-slope low on line 22 lasts only one clock period a reset pulse to up-down counter 28 is generated. This happens because inherent propagation delays in the logic circuit 18 cause the "T" input to flip-flop 46 to fall before line 22 changes to a low level. Flip-flop 46 has not changed state, but line 22 is now low and line 34 is high; a condition that would cause flip-flop 46 to change state at the next negative trigger or clock transition. If, at the next clock pulse, sloper detector 14 indicates a negative slope condition, line 22 will again go high and line 34 will go low; an input condition that will not change the present state of flip-flop 46. It is important here that lines 22 and 34 assume their voltages before the "T" input receives a negative voltage transition. This is guaranteed by the intentional delay of the pulse shortener 20. The upper terminal of gate 48 has remained high, and when inverter 52 causes a positive pulse on the lower terminal of gate 48 due to the slope reversal indication from flip-flop 110, a reset pulse for counter 28 is generated at the output of gate 42.

The invention also discriminates between significant chromatographic peaks and noise peaks. This is done with the realization that noise signals generally are considerably shorter than significant chromatographic peaks and that inhibiting their readout increases the accuracy of the readout. This is accomplished as follows.

When no slope occurs, as during a baseline, line 34 is high. An inverter 60 inverts this high and applies the resulting low to the J and K terminals of a J-K flip-flop 62. It also applies the low to reset terminals $C_D$ of the flip-flop 62 and a second flip-flop 64. This resets the flip-flops so their Q terminals are low. Assuming flip-flop 66 is also reset an output line 68 is now high. This high output is used to inhibit a read-out such as a printer or numeric indicator in the processor 12. When a slope in the signal is detected (either positive or negative) lead 22 goes high and lead 34 goes low. This removes the reset lows from terminals $C_D$ of flip-flops 62 and 64 via inverter 60. An inverter 69 connected to the output of gate 42 fails to change this condition The latter output is at a low due to the D.C. decoupling of capacitors 38 and 54 and to the resistors 40 and 50. This causes both inputs of NAND gate 42 to be high under quiescent conditions. Flip-flops 62 and 64 are now free to toggle.

The first negative clock transition on lead 30 causes flip-flop 62 to produce a high logic "1" voltage at its "Q" output. The second negative transition on lead 30 causes the "Q" output of flip-flop 62 to fall to a logic "0" level, which in turn causes the "Q" output of flip-flop 64 to go high (logic "1"). The "Q" output of flip-flop 64 has now conditioned the "J" input of flip-flop 66 to allow a change of state to occur in flip-flop 66. A delayed clock 70 furnishes this change of state with the first negative transition of pulses therefrom. The clock 70 may be of any type as long as its rate is equal to or greater than the pulse repetition rate of the clock 16. If the clock 70 has the same pulse repetition rate as the clock 16 its phase must be such that its pulses follow the pulses of clock 16 by a short period. In the present embodiment the clock 70 is driven by the clock 16 to emit pulses at the same repetition rate as clock 16 but at slightly delayed phase. The delay is greater than that of delay circuit 37. The delayed pulse from clock 70 changes the state of flip-flop 66.

When flip-flop 66 changes state its $\bar{Q}$ output terminal becomes low. This enables a readout 72 device in the processor 12. This readout device includes its control circuit as well as a printout device. When the readout device 72 completes its readout it applies a reset signal to the reset terminal $C_D$ of the flip-flop 66. The latter again inhibits further readout.

By virtue of these signals, readout is enabled only if a slope indication exists for two consecutive pulse counts. This inhibits reading of short peaks that represent noise.

The inverter 69 modifies this effect to assure that the slope which is being counted is for two consecutive positive slope periods or two consecutive negative slope periods. It inhibits the effect when a negative slope for one pulse period is followed by a positive slope for one pulse period or vice versa. The inverter 69 does this by furnishing a high whenever a pulse from gate 42 indicates either that there is an immediate transition from negative to positive slope or a transition from positive to negative slope within one pulse period. This resets the flip-flops 62 and 64 by setting their reset terminals $C_D$.

The reset signal is applied to flip-flop 64 to insure that the resetting of flip-flop 62 does not erroneously set flip-flop 66, should the Q output of flip-flop 62 be high when the reset command is applied.

The invention may also be embodied without a separate timer or counter means in the form of flip-flops 62, 64 and 66 to discriminate against noise signals that are either too short or have too fast a rise and fall time to be classified as chromatographic peaks. According to another embodiment the up-down counter produces an output signal that allows printing of a chromatographic peak only when the up-down counter exhibited a count of two or greater sometime during the course of the chromatographic peak signal. Extremely short or fast-rising peaks only bring the up-down counter up to a count of 1, and therefore no print would be made of the peak area.

The circuit 18 operates from the output of the slope detector 14. The voltage waveform at the output of detector 14 is a pulse of a time duration approximately equal to that of the clock pulse. The polarity of the pulse is positive going for increasing signal voltage or positive slope of the signal. The pulse is negative going for negative slopes, i.e. decreasing voltage levels.

An amplifying and clipping inverter 76 clips the pulses appearing at the slope detector 14 and inverts them. A flip-flop 78 receives the clipped and inverted pulses. A sample of the pulse shape of the inverted pulses at the input to flip-flop 78 appears in FIG. 2. Shown is a negative going pulse that has a transition from +5 volt level to a 0 volt level. Because of the clipping action of the inverter 76 the pulse at the output of inverter 76 has the same magnitude regardless of whether the slope exceeds the minimum or threshold values slightly or greatly. The pulse coincides approximately in times with the clock pulses from clock 16.

Forming the flip-flop 78 are two cross connected gates 80 and 82. The gates 80 and 82 similarly drawn gates are conventional logic elements commonly used in integrated circuit logic systems, for example, so called NAND gates. They may be any conventional type such as DTL or TTL. In the context of the logic in circuit 18 the term positive or high or logic one refers to a potential of +5.0 volts and the term negative or low a potential of zero or near zero volts. Thus a negative going pulse or a low pulse or logic zero pulse is one that starts at +5.0 volts, drops to 0 or near 0 volts, and rises again to +5.0 volts. A "negative" logic or low or logic Zero signal or potential or level is 0 or near 0 volts. Similarly a positive or high pulse is a pulse that goes from 0 or near 0 volts to 5 volts, and then returns to 0 or near 0 volts. A positive or high logic signal or potential or level is +5.0 volts.

The flip-flop 78 is set to one of its two stable states by a negative going set pulse from the pulse shortener 20. Such a set pulse appears in FIG. 3. It is derived as described in the beforementioned copending application of Robert W. Allington, filed concurrently herewith.

The set pulse from pulse shortener 20 occurs regardless of the slope detected by slope detector 14. The low of the set pulse at the input of gate 82 produces a high output potential and a high input to gate 80.

In the absence of a slope and hence a potential from slope detector 14, the output of amplifying inverter 76 is positive or high (+5 volts). The other input to gate 80 is also high. This places a low near zero potential at the output of gate 80.

The low at the output of gate 80 also appears at the other input of gate 82. Return of the lower input of gate 82 to a high now fails to change the stable condition of the flip-flop because the top low or negative input to gate 82 keeps its output positive. The set pulse has thus set flip-flop 78. The output of gate 80 is low.

The arrival of a low or negative pulse from inverter 76 indicates a positive change in signal level beyond the preset threshold or minimum level i.e. a positive slope. The low pulse, because it precedes the start of the set pulse at pulse shortener 20 flips the flip-flop 78 by turning the output of gate 80 positive. The negative or low pulse from inverter 76 keeps the output of the gate 80 high even during the set pulse. After the set pulse but during the low logic pulse at inverter 76, the inputs to gate 82 are both positive or high. The inputs to gate 80 are both negative or low. Thus the end of the low logic pulse leaves a high at the output of gate 80. Thus a positive voltage (5 volts) or high at the output of gate 80 indicates a positive slope in the chromatographic signal.

If the slope returns to zero or becomes a negative, the positive level at the top of gate 80 and the negative set pulse flip the flip-flop and return the output of gate 80 to near 0 or low.

In response to a negative slope, two cascaded amplifying and clipping inverters 92 and 94 clip and twice invert a negative pulse at slope detector 14. Thus a negative or low pulse appears at a flip-flop composed of gates 96 and 98. This flip-flop produces a high at a terminal 100 in response to a negative slope at the slope detector 14. Upon return to no-slope or positive slope, the flip-flop composed of gates 96 and 98 produces a near zero potential (low) at the output of gate 98. When potentials at the outputs of gate 80 and 98 are both low, this indicates that the slope is not positive and not negative but nearly flat.

Inverters 102 and 104 invert the potentials at the outputs of gate 80 and 96.

A flip-flop 110 composed of gates 112 and 114 receives inputs from the inverters 102 and 104. A negative or low (i.e. near zero) voltage from inverter 102 or 104 causes the flip-flop 110 to switch into a state agreeing with this voltage. That is, if gate 102 goes low, thereby indicating a positive slope at detector 14, the inputs to gate 112 are both low and the inputs to gate 114 both high. Thus line 24 becomes high and line 26 low. Terminals 116 and 118 remain in this condition even if the input slope becomes zero. This is so because the outputs from inverters 102 and 104 are then both high. One input to gate 112 is then negative or low and both to gate 114 are high. This produces no change in output. If the slope becomes negative, the output of gate 98 goes high. This switches the flip-flop 110 so that output of gate 114 is high and the output of gate 112 low (near zero). Thus although the slope may become zero, the outputs at gates 112 and 114 remain at the potentials set at the last positive or negative slope. Thus gates 112 and 114 furnish a memory function that indicates whether the slope of the chromatographic signal was either positive or negative prior to the zero slope.

A gate 120 receives inputs from inverters 102 and 104 produces a high on line 22 when the input signal slope is either positive or negative. It produces a low or negative (near zero) output only when the slope is near zero.

The invention may also be embodied on an analog basis. According to this embodiment the up-down counter is replaced by a charging and discharging storage capacitor. This capacitor is gradually charged during the time related to the slope, and gradually discharged during the time related to a zero slope. Reset is applied to the capacitor by rapidly discharging it. The zero output condition corresponds to the capacitor being discharged to a certain specific low voltage.

The invention furnishes a method for the separation of noise signals and legitimate chromatographic peaks. Noise signals tend to be shorter in duration than chromatographic peaks. The invention rejects peaks if they are too short. This is done by rejecting the peak readout when the rise time or the fall time of the peak is too short. This is accomplished by means of a timer which is activated when the slope of the chromatographic signal is not zero. The timer also is reset at times corresponding to the resetting of the counter 28. This invention provides an additional desirable characteristic when it is used in conjunction with a clocked slope detector. A user of the apparatus ordinarily sets the clock rate control application to a certain frequency related to the duration of the chromatographic peaks, in order to effectively detect and determine their slopes. This same clock signal is used in this invention for providing information necessary for the compensation of tailing and information necessary for the rejection of noise signals which are not to be classed as legitimate chromatographic peaks. Therefore, no separate control for this purpose is required that the user of the apparatus would otherwise need to manipulate.

In operation the chromatograph 10 tests a fluid, and on the basis of the fluid components generates signals composed of a series of peaks interrupting a baseline. The processor 12 utilizes these signals. The slope analyzer 14 generates a series of pulses each representing a sample of the chromatograph signal. The logic circuit 18 generates potentials which indicate the signal either to have a slope or not have one. The up-down counter 28 counts the pulses that come from clock 16 after a first slope of a peak appears and during slope times thereafter in the peaks. It subtracts pulses that come from the clock during periods of no slope. When the counter reaches zero, it stops counting and emits a signal. If the slope is zero at the zero count signal the gate 36 passes the next clock pulse as correct signal to allow the processor 12 to readjust or otherwise utilize the chromatograph signal. Since within any peak the time of the slope exceeds the no-slope time, the correct signal can occur only after the peak has ended. This assures that any processor readjustment is allowed to proceed only during non-slope times on the baseline, not during a peak where errors would occur.

A bypass circuit composed of elements 38 to 54 determines whether during the peak, the no-slope time is non-existent or sufficiently short so that because the peak is sharp, processor readjustment need not wait until the counter counts down from the total slope time. In that case the bypass circuit resets the counter 28 to zero and up-counting resumes shortly after the apex of the peak. This produces a short up-count and results in a correspondingly low downcount, and an early adjustment is permitted after the peak ends. It avoids needless wait after sharp peaks.

A storage system composed of elements 60 to 70 counts the consecutive clock pulses during a positive slope or during a negative slope. If there are less than two consecutive clock pulses during a positive slope or during a negative slope, the system inhibits readout of the signal in the processor 12.

A simple convenient analyzer results. It furnishes noise rejection and avoids adjustment of the signal during peaks without waiting too long after sharp peaks.

After the counter 28 reaches zero and the slope remains near zero it continues to apply an output to gate 36 with each clock pulse. Gate 36 then continues to furnish pulses to the processor 12 as long as the slope is zero, during each clock pulse.

NAND gates and circuits are described in the text Pulse, Digital, and Switching Waveforms, by Jacob Millman and Herbert Taub, published in 1965 by the McGraw Hill Book Company of New York, on pages 330–334. DTL and TTl logic devices are described in that text on pages 330–358.

J-K flip-flops are well known and available as such commercially. They are, for example, described in the publication Application Memos, published by the Signetics Corporation of Sunnyvale, California in 1968. Up-down counters are also described in that publication.

While the invention has been described in detail it will be obvious to those skilled in the art that the invention may be embodied otherwise without departing from its spirit and scope.

What is claimed is:

1. In an apparatus including a slope detector for detecting the slope of time-varying signals occurring at an apparatus input means with a baseline potential, a circuit for indicating that a time-varying signal has ended after its slope is substantially in the range of the slopes of some baseline potentials, comprising:
   storage means for storing a slope-time signal;
   first control means for causing the value of said slope-time signal in said storage means to be increased at least during a portion of the time that said slope detector detects a slope; and
   second control means for causing the value of said slope-time signal stored in said storage means to be decreased while said slope detector does not detect a slope;
   said storage means including means for providing a signal-end signal when the stored slope-time signal reaches a predetermined value, whereby said signal-end signal is provided by said storage means a period of time after said slope detector stops detecting the slope of the signal, which period of time is related to the time that said slope is detected.

2. A circuit for indicating that a time-varying signal has ended in accordance with claim 1 in which:
   said storage means includes an up-down counter having an up terminal, a down terminal, a clock pulse terminal and an output terminal;
   said first control means being electrically connected to said up terminal;
   said second control means being electrically connected to said down terminal;
   said circuit further including a source of clock pulses;
   said source of clock pulses being electrically connected to said clock pulse terminal, whereby said up-down counter counts said clock pulses up when said first control means applies a signal to said up terminal, counts said clock pulses down when said second control means applies a signal to said down terminal and applies an output signal to said output terminal at a predetermined count.

3. A circuit for indicating that a time-varying signal has ended in accordance with claim 2 in which said means for providing a signal-end signal includes signal-end gating means, having inputs connected to said source of clock pluses, said output terminal of said up-down counter and said second control means and having a signal-end gating-means output terminal, for providing said signal-end signal when a clock pulse occurs, said predetermined count in said up-down counter is reached, and said slope detector does not detect a slope of the time-varying signal all at the same time.

4. A circuit for indicating that a time-varying signal has ended in accordance with claim 3 further including:
   classification means for recognizing different waveforms of said time-varying signals;
   said classification means including means for altering the amount by which said value of said slope-time signal must be decreased by said second control means before reaching said predetermined value when certain waveforms are detected.

5. A circuit for indicating that a time-varying signal has ended in accordance with claim 4 in which said means for altering the magnitude that said value of said slope-time signal must be decreased includes a means for resetting said up-down counter.

6. A circuit for indicating that a time-varying signal has ended in accordance with claim 4 in which said classification means further includes a means for generating a rejection signal when certain waveforms are detected.

7. A circuit for indicating that a time-varying signal has ended in accordance with claim 6 in which said means for generating a rejection signal includes means for generating a rejection signal when the duration between consecutive changes in the sign of the slope of any portion of the waveform is less than a predetermined time.

8. A circuit for indicating that a time-varying signal has ended in accordance with claim 3 further including classification means for resetting said up-down counter when said slope of said time-varying signal changes from a positive slope to a negative slope within a predetermined time, whereby said slope-time signal stored in said up-down counter is increased from said predetermined value only by the negative slope of said time-varying waveform before said second control means begins to decrease the value of the stored slope-time signal from the time that the slope detector ceases to detect a slope.

9. A circuit for indicating that a time-varying signal has ended in accordance with claim 8 in which:
   said up-down counter includes a reset terminal;
   said classification means includes a reset gating means for applying a reset signal to said reset terminal when enabled and a classification control circuit;
   said classification control circuit includes enabling means for enabling said reset gating means when said slope of said time-varying signal changes from positive to negative within a predetermined time; and
   said enabling means includes means for blocking said reset gating means when said slope of said time-varying signal changes to negative a period of time greater than said predetermined time after changing from a positive to a substantially zero slope.

10. A circuit for indicating that a time-varying signal has ended in accordance with claim 9 further comprising:
slope, no-slope means, having a slope, no-slope output means, for applying a first potential to said slope, no-slope output means in response to the detection of a slope and for applying a second potential to said slope, no-slope output means in response to the detection of no slope by the slope detector;
said slope, no-slope output means being electrically connected to said first and second control means;
one of said first and second control means including an inverter, whereby said first and second potentials are applied to one of the up terminal and down terminal and an inverter first and second potential is applied to the other of the up and down terminals of the up-down counter by the first and second control means.

11. A circuit for indicating that a time-varying signal has ended in accordance with claim 10 further including means for resetting the up-down counter when the slope detected by said slope detector changes to a positive value.

12. A circuit for indicating that a time-varying signal has ended in accordance with claim 10 in which said enabling means includes:
slope-memory means, having a positive-slope output means and a negative-slope output means, for storing a potential on the one of the positive-slope output means and negative-slope output means that corresponds to the sign of the last slope detected by the slope detector; and
means, connecting said gating means to said slope-memory means and said slope, no-slope means, for applying enabling signals to said gating means when the potential on said one of said positive-slope output means and negative-slope output means changes polarity at any time during a period of time extending from the time that the first potential is being applied to said slope, no-slope output means to the end of a short period of time after said first potential is applied to said slope, no-slope output means.

13. In an apparatus having a measuring device for measuring one characteristic of a time-varying signal, a circuit for indicating a second characteristic of the time-varying signal, comprising:
first means for providing the value of said one characteristic during at least a portion of the time-varying signal when said characteristic is of a first type;
second means for providing the value of said one characteristic during at least a portion of the time-varying signal when said characteristic is of a second type; and
third means for comparing said value of said one characteristic when said characteristic is of a first type when said value of said one characteristic when said characteristic is of a second type;
said third means including indicator means for providing an indicator output signal when the difference between said value of said one characteristic when said characteristic is of a first type and said value of said one characteristic when said characteristic is of a second type reaches a predetermined value to indicate said second characteristic of said time-varying signal.

14. A circuit according to claim 13 in which said third means includes an up-down counter and said indicator means includes the output signal generator of said up-down counter.

15. A circuit according to claim 14 in which:
said up-down counter includes an up terminal, a down terminal and a clock pulse terminal;
said clock pulse terminal being adapted to be electrically connected to a source of clock pulses;
said measuring device includes a slope detector;
said first means includes means for applying an enabling signal to said up terminal of said up-down counter when said slope detector detects a slope on a time-varying signal;
said second means includes means for providing an enabling signal to said down terminal of said up-down counter when said slope detector detects no slope on a time-varying signal, whereby said indicator output signal indicates that the difference between the time that at least a portion of said time-varying signal has had a slope and the time that no slope has been detected has reached said predetermined value.

16. A circuit according to claim 13 in which said third means includes a storage means for storing the difference between the one value of said one characteristic during at least a portion of the time-varying signal when said characteristic is of a first type and the value of said one characteristic during at least a portion of the time-varying signal when said characteristic is of a second type.

17. A circuit according to claim 16 further comprising a reset means for resetting said storage means when said one characteristic changes from the first type to the second type within a predetermined period of time.

* * * * *